United States Patent
Rumsewicz et al.

(10) Patent No.: US 6,832,255 B1
(45) Date of Patent: Dec. 14, 2004

(54) ACCESS CONTROL METHOD AND APPARATUS

(75) Inventors: Michael Peter Rumsewicz, Victoria (AU); Maurice David Castro, Victoria (AU)

(73) Assignee: Royal Melbourne Institute of Technology, Victoria (AU)

( * ) Notice: Subject to any disclaimer, the term of this patent is extended or adjusted under 35 U.S.C. 154(b) by 0 days.

(21) Appl. No.: 09/673,609

(22) PCT Filed: Apr. 20, 1999

(86) PCT No.: PCT/AU99/00297

§ 371 (c)(1),
(2), (4) Date: Nov. 28, 2000

(87) PCT Pub. No.: WO99/55040

PCT Pub. Date: Oct. 28, 1999

(30) Foreign Application Priority Data

Apr. 20, 1998 (AU) .............................................. PP 3082

(51) Int. Cl.[7] .............................................. G06F 13/00
(52) U.S. Cl. ........................ 709/227; 709/229; 709/224
(58) Field of Search ................................. 709/229, 224, 709/227

(56) References Cited

U.S. PATENT DOCUMENTS

| 6,324,570 B1 | * | 11/2001 | Tonchev et al. | ............ 709/207 |
| 6,490,624 B1 | * | 12/2002 | Sampson et al. | ............ 709/227 |
| 6,606,661 B1 | * | 8/2003 | Agrawal et al. | ............ 709/227 |
| 2003/0099197 A1 | * | 5/2003 | Yokota et al. | ............... 370/230 |

FOREIGN PATENT DOCUMENTS

JP          2004064346 A    *    2/2004    ............ H04Q/7/38

* cited by examiner

Primary Examiner—Kenneth R. Coulter
(74) Attorney, Agent, or Firm—Nixon & Vanderhye. P.C.

(57) ABSTRACT

A method and an interface unit (10) for controlling access to a server (6) by one or more clients (4). The unit (10) includes a monitoring means (22) which monitors resource usage of the server (6) and admission means (20) which allows a connection of one client to pass to the server (6) if the connection forms part of an active session. The admission means (20) also rejects or allows a new connection of another client to pass to the server (6) in accordance with an admission control scheme.

42 Claims, 11 Drawing Sheets

ACCESS CONTROL METHOD AND APPARATUS

The present invention relates to a method and apparatus for controlling access to one or more servers in a network, and more particularly relates to a method and apparatus that controls the admission of new users to the one or more servers such that users already accessing server resources will receive priority service over new users attempting to access a server.

In a computer network, such as the Internet which represents a vast number of computers linked to each other worldwide, information exchange such as e-mail may occur between various computers linked through the Internet using a set of protocols such as the transmission control protocol/Internet protocol (TCP/IP). A "client" may typically be a web browser running on a computer. A client typically communicates with a "server". A server may uniquely distinguish clients using an IP address and possibly other identifiers. Other examples of clients include proxy servers and web robots. Information on the Internet may be made available to the public through "servers". Servers are computers which make available files or documents they hold. The worldwide web (www) is a method of accessing this information from the servers and allows a user to navigate the resources of the Internet by displaying or downloading pages of information that are stored at the servers. Clients communicate with servers using the hypertext transfer protocol (HTTP). In the Internet the HTTP protocol is generally transmitted over TCP/IP.

Usage of the Internet and the worldwide web is increasing at a very rapid rate and more and more new users are being connected to the Internet and www. As its growth continues, the www will provide a rapidly growing number of commercial services, with applications ranging from information retrieval for text, images or multi media through to purchasing, for example, ticket and item sales. As such, there is a need to improve the reliability of the web so as to make it a suitable medium for high volume, business critical applications.

During periods of high use of a web server, even in situations such as overload of the server wherein the load of requests to the web server exceeds the capabilities of the server, the server still allows requests from new users. These capabilities include the physical capacity of the CPU, the memory and the network. Continuing to allow requests from new users tends to degrade the performance perceived by users that are already accessing the server system and which is evidenced through long delays or inability to service information requests. For example users already accessing web pages on a server may experience poor performance as they navigate through links to pages on that same server. The performance as perceived by already accessing users is assessed in terms of maintaining throughput, response time levels and system stability rather than by increasing the overall throughput of the web server.

The present invention seeks to address this problem by providing a system that allows a server to accept or deny access by new users to that server in preference to those already accessing the server. Such a decision for accepting or rejecting the admission of new users is based on certain performance parameters, such as the setting of the congestion level at the server.

Accordingly, the present invention provides a method of controlling access to a server by a client to a server in a network, said method comprising the steps of:

monitoring resource usage of said server; allowing a connection of said client to pass to said server where said connection forms part of an active session wherein said connection forms part of said active session if at least one previous connection from said client has been passed to said server within a predetermined time interval, and allowing or rejecting a new connection of another client to pass to said server according to an admission control scheme.

The step of allowing or rejecting may be based on resource usage of said server. The method may include searching for an active session of said client and admitting the clients connection to pass to said server if there is an active session for said client.

The method may include determining a congestion level from monitoring the resource use on said server. The congestion level may be represented by a whole number between zero and $c_{max}$ where zero indicates that the server is operating normally and $c_{max}$ is the maximum congestion level. The congestion level may be used to calculate an admission interval which represents the time after which a new session for a new connection can begin.

A new connection may be admitted after the admission interval expires. Periodically, a determination is made on whether the resource usage is high, and if it is high the congestion level is increased. The method may include checking whether a client has had a connection attempt rejected within a predetermined period.

The present invention also provides an interface unit for controlling access to a server by a client in a network, said interface unit comprising:

means for monitoring resource usage of said server;

admission means for allowing a connection of said client to pass to said server where said connection forms part of an active session wherein said connection forms part of said active session if at least one previous connection from said client has been passed to said server within a predetermined time interval, said admission means further rejecting or allowing a new connection of another client to pass to said server according to an admission control scheme.

The admission means further rejecting or allowing said new connection may be based on said resource usage of the server. The monitoring means may be in the form of a storage means, such as a database that maintains information about previous sessions, a list of active sessions and routinely polls said server to obtain resource information on that server. The interface unit may be linked to the computer network through an external port and be linked to the server through an internal port. The interface unit may be a computing processor and the admission means may be a control unit for rejecting or admitting a new connection to said server.

The invention will now be described in a preferred embodiment with reference to the accompanying drawings wherein.

Figure 1:
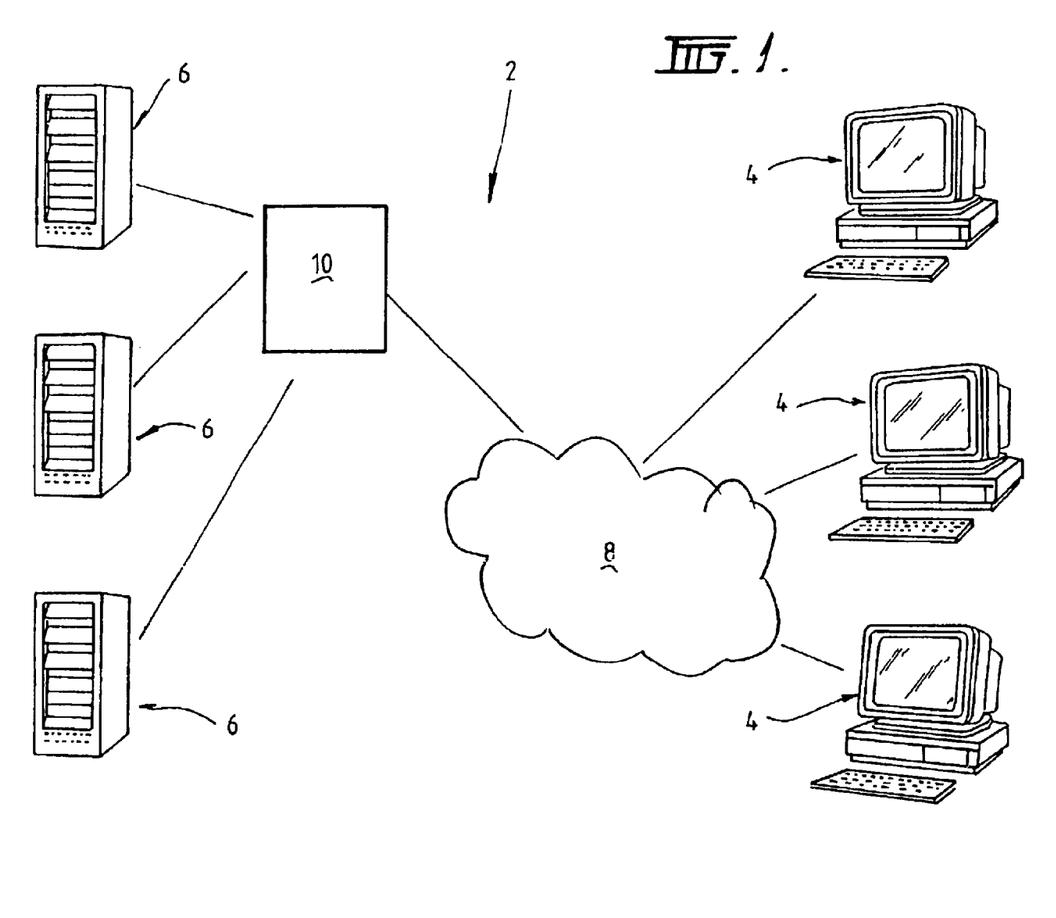
FIG. 1 shows a computer network system that links clients to servers through the network.

In FIG. 1 there is shown a system 2 that links one or more clients 4, either being workstations or PCs, with one or more servers 6 through a network 8, which may be a computer network such as the Internet. Each of the servers 6 is connected to the computer network 8 through interface means 10. Typically when a user wishes to access a server 6 for the purpose of reading or downloading a web page, they will initially input the address or universal resource locater (URL) identifying a web site or web page that one or more server 6 will handle or have stored. Where one of the servers 6 has many requests to obtain information for a number of users it can become overloaded and consequently provide a degradation in service to each one of the users accessing the server 6 through respective clients 4. In situations where the demands on a server 6 are high, even on the verge of overloading the server 6, the interface means 10 which is implemented as a computing processor, and more particularly as an interface unit, monitors critical resource usage on the server based on predefined parameters, and maintains a derived parameter known as the congestion level of the system. Based on this congestion level, the interface means 10 controls a number of new users allowed to access data on the server 6. At this stage each of these new users are defined as "not participating in an active session" on server 6. Thereafter any one of these new users that is allowed to access data is then said to have an "active session" on the server 6. All other users are blocked and are said to "not have an active session" on the server 6. The blocked users are either placed in a queue until such time they are allowed access to the data or the users are rejected outright. Users placed in the queue may also be eventually rejected outright. The definition of "active session" generally is that the user has communicated with a server within a defined period, typically the last N minutes. This definition is based on user behaviour, for example, where a user downloads a page, spends a short period of time reading the page, then downloads another page and so on. The interface unit 10 also determines, in real-time, the rate at which new requests to the server 6 can be accepted while still providing an acceptable quality of service for already accepted requests. It also maintains a table of "active sessions", and accepts an appropriate rate of new requests while rejecting all other new requests.

The interface unit 10 implements an admission control scheme to determine whether users are admitted or rejected. This determination is based on a current and past server resource use at the web server 6 such as memory capacity, bandwidth use on the link from the server 6 to the Internet 8, resources available on the interface unit 10 and processor load or utilisation. Specifically, server resources that are monitored include CPU utilisation, number of pages, number of pages swapped in and out, memory used, number of disk input/output operations and average disk delay since the last poll by the interface unit 10 of the server 6 for its current resource usage took place. If sufficient resources are not available, a rejection message (possibly with an explanatory note) is sent to users who attempt to gain admission but are not admitted.

Figure 2:
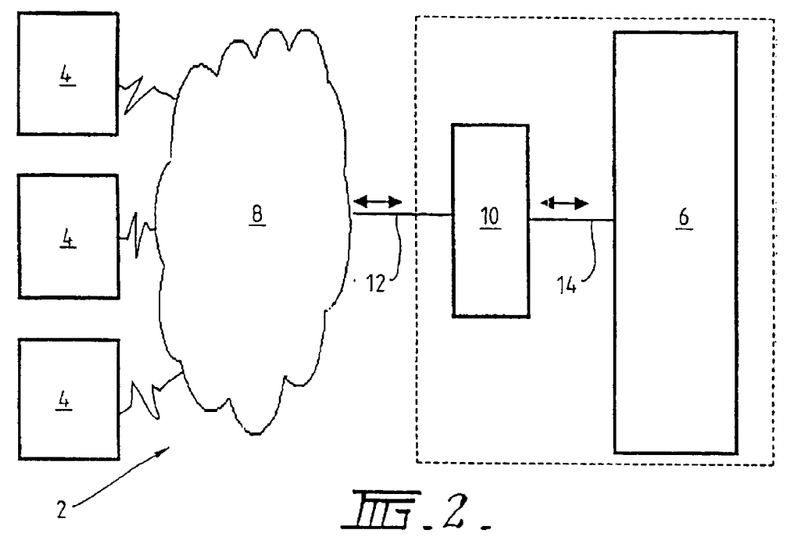
FIG. 2 is the system of FIG. 1 showing just one interface unit linking one server to a number of clients through the network.

As mentioned previously, any one or more of the servers 6 communicates with each of the clients 4 through the interface unit 10 over the computer network 8. The interface unit 10 may be connected to several servers 6 and determines admission of new sessions by monitoring resource usage on each server 6. A session with a client represents at least one admitted connection from the client. Referring to FIG. 2, the interface unit 10 is linked to the Internet 8 through link 12 and to the server 6 through link 14. Generally it is preferred that the bandwidth of the link 14 between interface unit 10 and server 6 exceeds the bandwidth of link 12 between the interface unit 10 and the computer network or the Internet 8.

The architecture FIG. 2 can be realised in several different ways. Firstly, the interface unit 10 can run on a multihomed computer with one connection running to the Internet 8 and another connection to the computer that supports the server 6. A multihomed computer has two or more physical interfaces to Internet protocol based networks. Secondly, the interface unit 10 can run on the computer supporting the web server 6 with the interface unit 10 using Internet domain sockets to communicate with the Internet 8 and Unix domain sockets to connect to the web server 6. The HTTP protocol is used on both the Unix domain and the Internet domain sockets. Thirdly, the interface unit can be built into the web server 6 so that all communication with the Internet 8 is performed by the interface unit module and communication with the server component is implemented through either function calls or shared memory.

Figure 3:
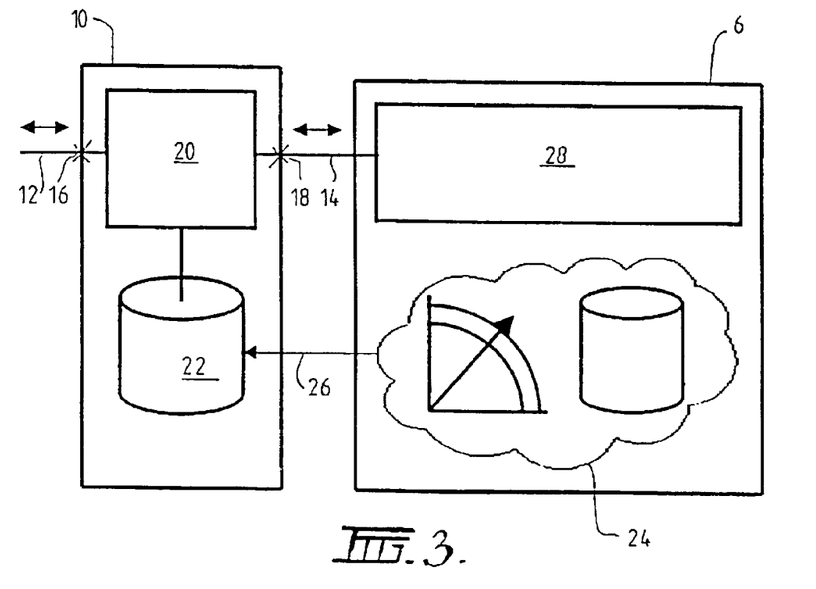
FIG. 3 is a diagram showing the individual components of a server and interface means.

In FIG. 3 there is shown the components of each of the interface unit 10 and the web server 6. An external port 16 of the interface unit 10 is a port supporting the HTTP protocol that connects the interface unit 10 to the Internet 8. An internal port 18 of the interface unit 10 is a port connecting the interface unit 10 to the www server 6. The ports are bi-directional. The number of outstanding connection requests which a port can maintain may be limited. Connections are stored in a buffer associated with external port 16 which must be polled to extract data. After polling, the IP address of the connection's client is then known. Data must be placed in a buffer associated with the external port 16 to be sent. The IP address is a unique identifier of a computer connected to the Internet 8 and each client is identified by such a unique IP address possibly in connection with further information.

A connection between the interface unit 10 and the client 4 is said to exist from when the interface unit 10 polls the port for the connection until the connection is closed. Data can be transferred bi-directionally through a connection. A client may begin an unrestricted number of connections, for example, a page request from a web browser typically requires a connection to receive the text and a connection for each graphical image. Under HTTP 1.0 a connection is closed by the server 6 immediately after the information has been transferred. Connections may be closed immediately by the server 6 and a connection does not imply admission to the server 6. Connected between the external port 16 and internal port 18 is a control unit 20 that admits or rejects a connection to the server 6. Control unit 20 admits or rejects new users in accordance with an admission control scheme to be described. A storage means 22, in the form of a history data base, implemented as a memory unit, maintains current and recent information for determining admission of connections such as:

resource usage, information about previous sessions and their resource usage so that predictions may be made about a future session, a list of active sessions of clients who currently have access to one or more servers, and in the case of a percentage throttling admission scheme (to be described), a history of rejected clients is also stored.

An active session is said to exist if the last connection from a client was made within a specific time interval, which is likely to represent the time period necessary to read a web page. A session ends when no connections are received from the client for the specified time interval. An active session must be associated with a history entry and a client.

When a new client connection is accepted by the interface unit 10 for the server 6, an entry is added to an "Active Session Table" in the history database 22. The entry includes the time at which the last client-server interaction occurred. This interaction can be either a user request arriving or the transmission of information from the server to the client. If more than INACTIVE_SESSION_TIMEOUT seconds elapses between server-user interactions, the session is deemed inactive. This is an indication that the user is no longer interested in the server 6. Inactive sessions are removed from the Active Session Table.

The history data base 22 obtains information on resources of the server 6 from a server storage means 24, in the form of a resources data base, over link 26. The server storage means 24 resides within the server 6. Every STATUS_REQUEST_TIME seconds, the database 22 polls the resources database 24 for that servers current resource usage. A server processor 28 handles all of the requests from various users for obtaining web pages and the like and is linked to the internal port 18 of the interface unit 10 through link 14.

Figure 4A:
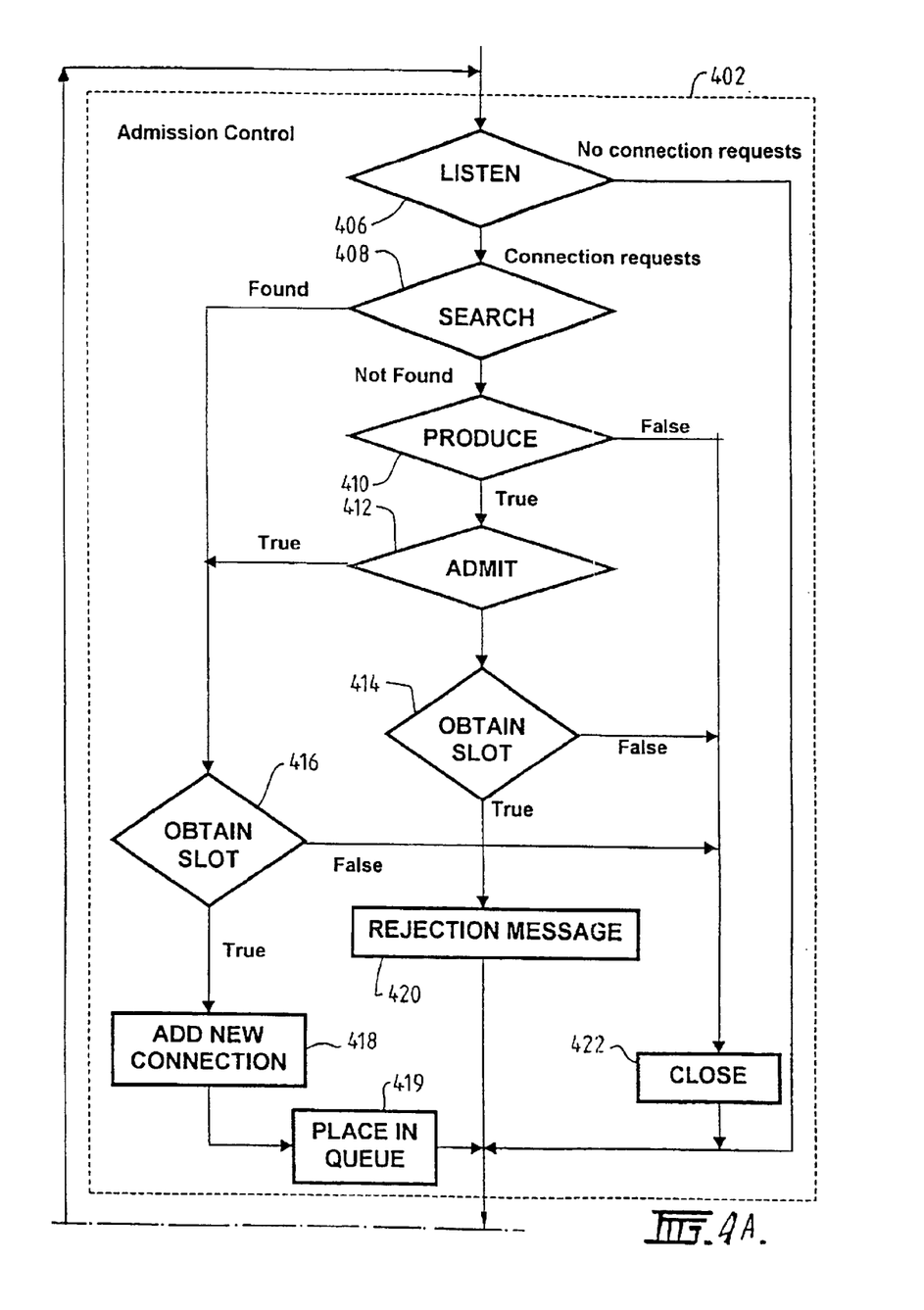
FIG. 4 is a flow diagram of a first connection admission control scheme.
Figure 4B:
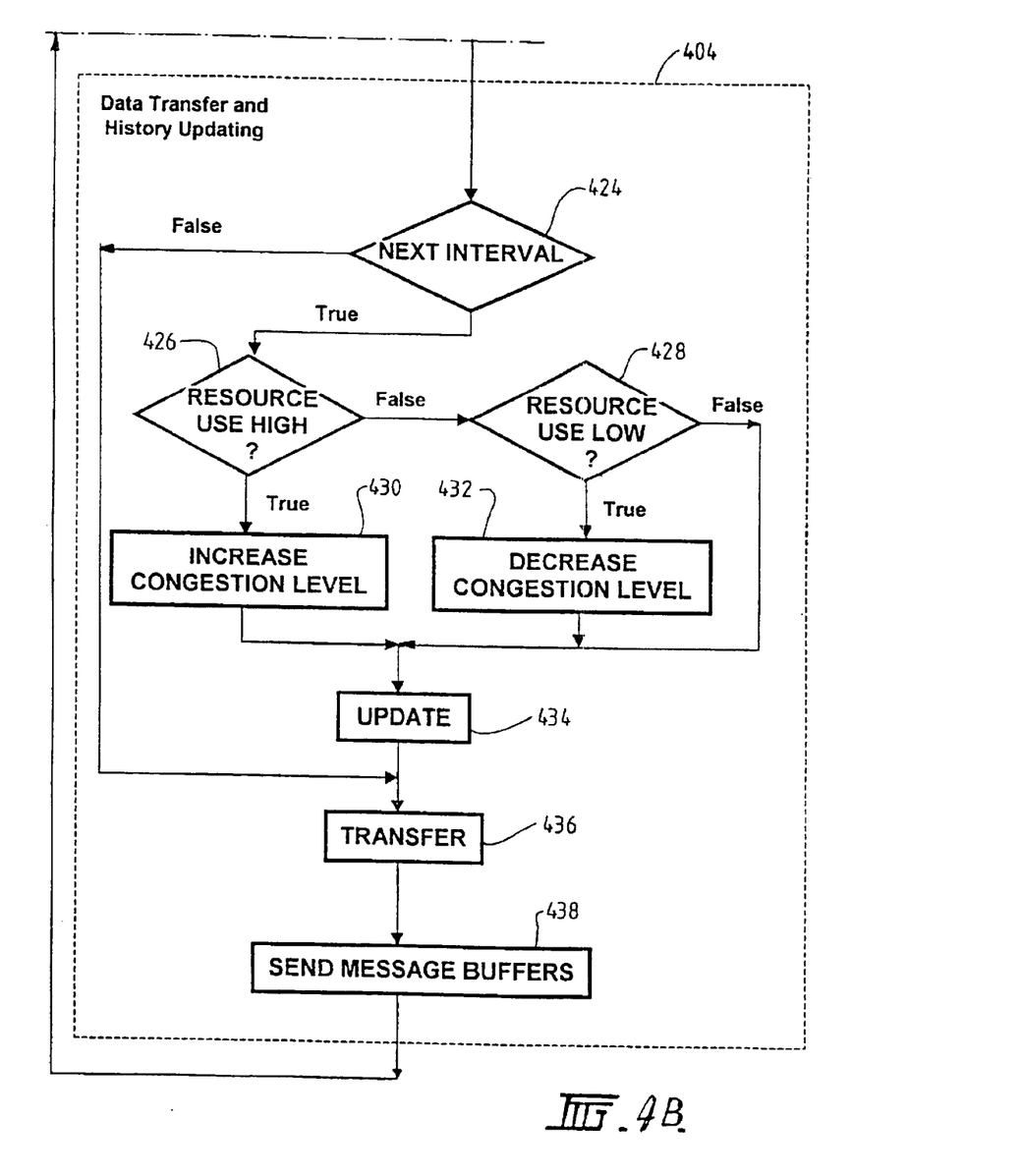

The operation of the interface unit 10 will now be described with reference to an admission control scheme called call gapping admission. With reference to FIG. 4 there is shown a flow diagram of the processes involved using the call gapping admission control scheme. The processes of the server 6 operate in a continual loop and are divided up into two sections, one being for the admission control part 402 the other being for the data transfer and history updating part 404. At step 406 the interface unit 10 listens or checks for connections from any one of the clients 4 at the external port 16. The external port 16 may store connection requests in a queue buffer or a connection request queue for a limited time. The external port 16 must be checked often for connections to avoid loss of connections including those for active sessions. If there are no connections from clients, flow proceeds to step 424 of the data transfer and history updating part 404. If there is a connection the process moves to step 408 where the history data base 22 is queried for an active session having the same IP address as the client making the connection. Only one connection can be handled for each iteration of the outside loop. If there is an active session, the connection is accepted by the control unit 20 and provided that there is an available "connection slot" at step 416. A connection slot is required for the transfer of data through a connection such that the slot maintains information relevant to the connections such as buffers, buffer sizes, the IP address associated with the external port buffer and the file handles for the connection. Data is stored in the internal port buffer prior to sending. If there is no available connection slot the connection is closed at step 422. If no data (including a rejection message) has been sent from the external port 16 to the client 4, the connection has been ignored. If there is a connection slot available the process proceeds to the data transfer and history updating part 404 starting at step 424. If the connection is a new connection it will only be added at step 418 if it meets the criteria of the call gapping admission scheme. A new connection is a connection from a client for which the history database contains no information. A new connection originates from a client who is "currently not participating in an active session" with server 6. The admission of a new connection begins an active session. The new connection is then placed in a queue at step 419 until such time that the data is able to be transferred. The call gapping admission scheme allows one new session to be started only after a calculated tine interval has elapsed since the last new session began. This time interval is determined by the current congestion level. The congestion level is a measure of how much traffic or requests are initiated from the clients 4 and is determined by monitoring resource use on one or more servers 6 and the utilisation of the link 12 to the Internet 8. A congestion level is represented by a whole number between zero and $c_{max}$ inclusive where $c_{max}$ is the maximum congestion level, with zero meaning that the server is operating normally. Therefore a high resource use increases the congestion level while a low resource use reduces the congestion level. Thus, when a request or connection arrives, a search is made of the Active Session Table. If the connection comes from an active session, it is immediately passed through to server 6. This gives priority to active sessions over new sessions.

Going back to step 408, if no active session is found through the search then the process proceeds to step 410 where a search is conducted for a "history entry" or an expired one that may be recycled if it exists. A history entry stores information about a client such as the last time that a connection from a client was closed and the IP address of the client. History entries may be recycled if they do not represent an active session. If there is no empty history entry the process moves to step 422 where the connection is closed. If an empty history entry is found or an expired one is recycled, then the process moves to step 412 and the connection is either admitted or rejected according to the call gapping admission scheme. For a connection to be admitted or for a rejection message to be sent, there must be a history entry available. If not, the connection is closed immediately.

Figure 6:
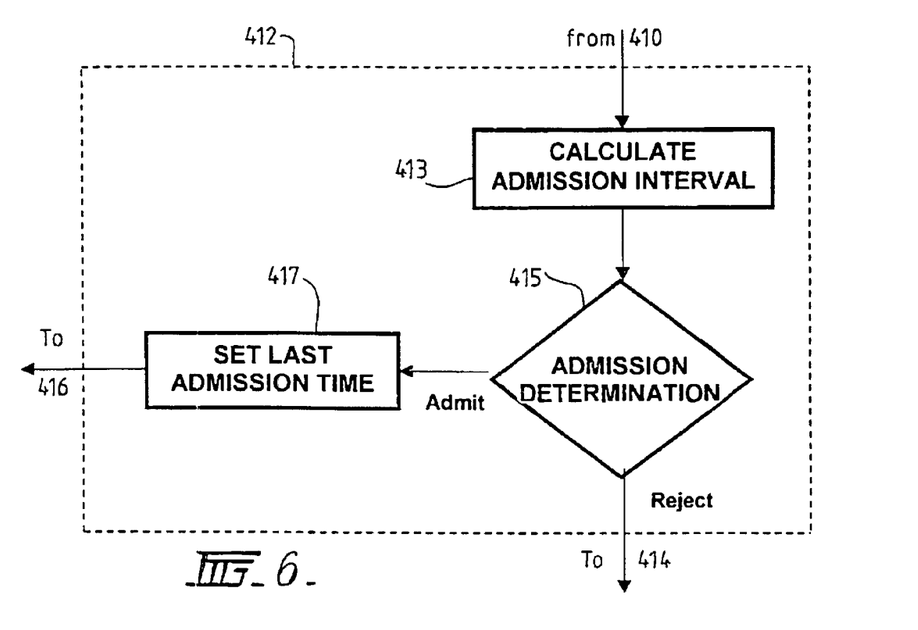
FIG. 6 is a detailed view of one decision point in the flow diagram of FIG. 4.

With reference to FIG. 6 the processes involved in admitting or rejecting a connection is disclosed in greater detail. Firstly at step 413 the admission interval is calculated. This is the interval after which a new session may begin and is a function of the congestion level. Firstly f (c) is calculated where c is the congestion level and f is a function which determines the time interval given the congestion level c. The process then moves to step 415 where an admission or rejection determination is made. A new connection will be admitted if $$t - t_1 > f(c)$$

where t is the current time, $t_1$ is the time of the last admission. If this is true then the connection is admitted and the process moves to step 417 where the last admission time is set. This is where the time of the last connection admission is updated to the current time, in other words, $$t_1 = t.$$

If the connection is admitted, a new active session begins provided a connection slot is available at step 416. A new history entry is then entered in the history data base 22. If the new connection is rejected the process moves to step 414 where a check is made for a connection slot, and if one is available, then a rejection message is added to the external port buffer for a specific client at step 420. If no connection slot is available then the connection is closed at step 422. The process reaches step 424 where a check is made to see if a constant time interval I has elapsed such that $$t - t_u > I$$

where t is the current time and $t_u$ is the time of the last update. The process then moves on to step 426 to determine if the resource use of the server 6 is high or if any of the resources are above predefined threshold levels. If this is the case, then the congestion level $c_n$ is increased at step 430. The congestion level $c_n$ is defined as $$c_n = \min(c_{n-1} + 1, c_{max})$$

where $c_n$ is the current congestion level, $c_{n-1}$ is the previous congestion level and $c_{max}$ is the maximum congestion level. So the congestion level is essentially incremented by one value. If the resource usage is determined not to be above predefined levels (not high), the process moves to step 428 to determine if the resource usage is low or in other words if all resources are below predefined threshold levels. If this is the case then the process moves to step 432 where the congestion level is decreased. The congestion level $c_n$ in this case is then defined as $$c_n = \max(c_{n-1} - 1, 0)$$

where $c_{n-1}$ is the previous congestion level. Therefore the congestion level $c_n$ is decremented by one value. If both the resource usage is neither high nor low or somewhere in between the predefined levels, then the process moves to 434 where updates take place in the history data base 22. This also occurs where an increase or decrease in the congestion level has occurred from steps 430 and 432 respectively.

The updates that occur include other history information, besides congestion level, for resources such as the capacity of the link 14 and the interface unit 10. This information is stored as entries in a database which correspond to regular, specified time intervals. The values held by the control unit 20 are stored in the database 22 if the time interval I has elapsed since the last update. The time is then set to $t = t_u$ where t is the current time and $t_u$ is the time of the last update.

Once the update has taken place at step 434 the process moves to step 436 where data is copied from the internal port 18 to the external port 16 of the interface unit 10. For each connection, if an error occurs or there is no remaining data to be sent the connection is closed. Where the interval I has not elapsed at step 424 if there is any data to be transferred between the ports 16 and 18 this takes place at step 436 as well.

All of the rejection messages that have been stored at step 420 in a message buffer, associated with the external port, are sent to the respective clients at step 438 and if there is no information remaining in the message buffer, then the connection is closed for each client. The process then reverts back to step 406.

Essentially the purpose of the data transfer and history updating unit 404 is to maintain the history information about the link 14 between the interface unit 10 and the server 6 and the resource usage of the server or servers 6. It is also used to transfer data between both the internal and external ports 18, 16 of the interface unit 10 and to send the rejection messages via the external port 16. The history information and congestion level are only updated if a specified time interval I has elapsed since the last update.

Figure 5A:
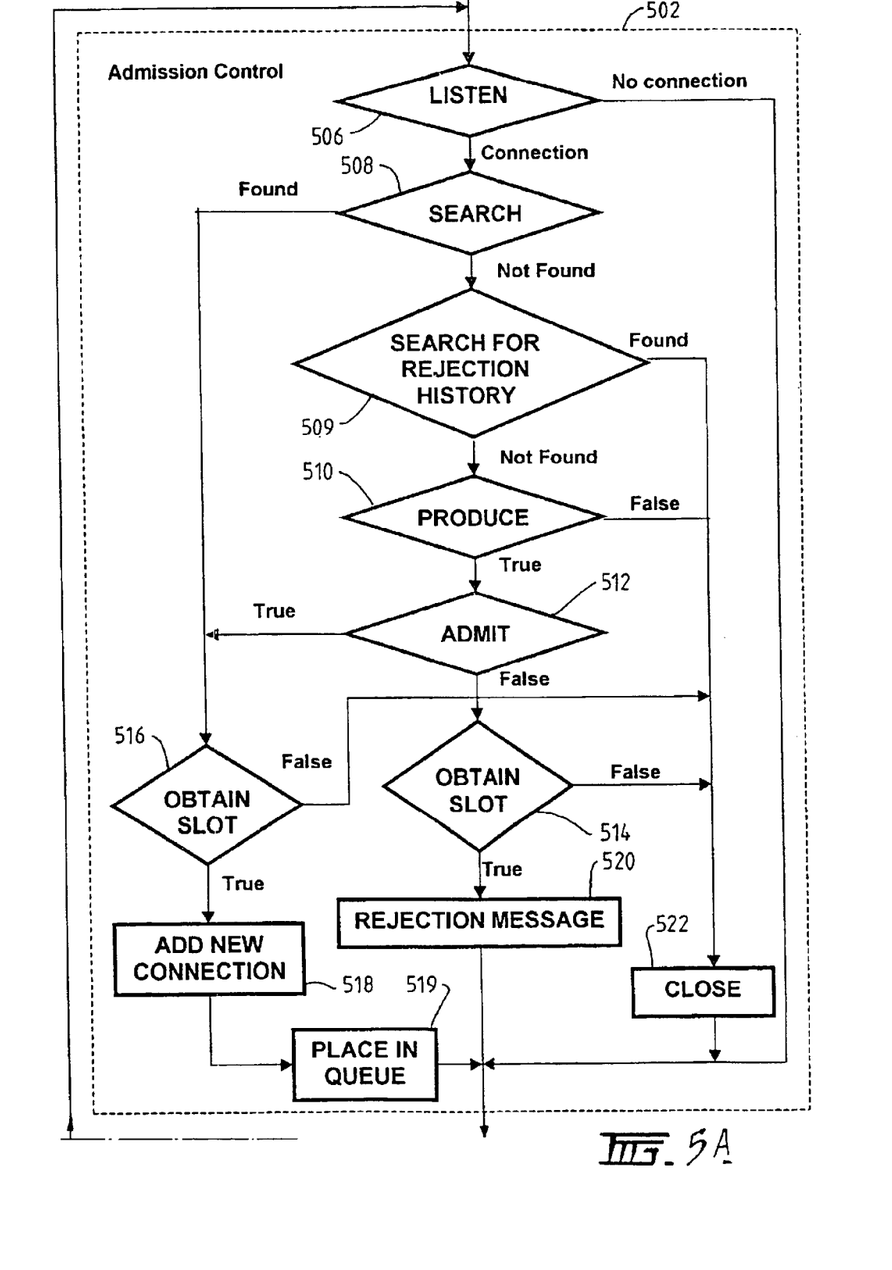
FIG. 5 is a flow diagram of a second connection admission control scheme.
Figure 5B:
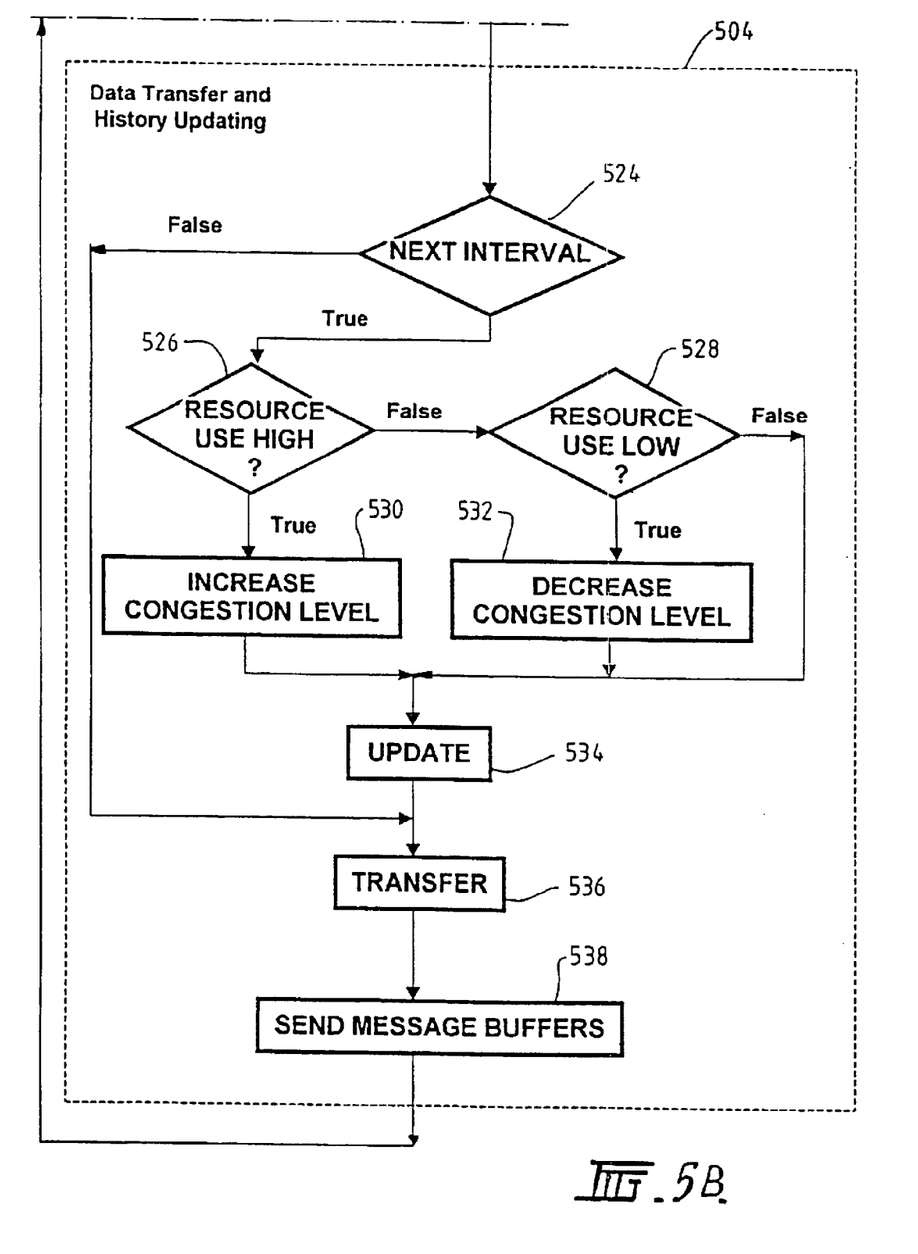

Another admission control scheme is known as the percentage throttling admission scheme which allows a proportion of new sessions to be started according to the particular congestion level. A flow diagram depicting this scheme is shown at FIG. 5 which is split into two parts, one part being for admission control 502 and the other part being for data transfer and history updating 504. All of the steps shown in the flow diagram in FIG. 5 are identical to those shown at FIG. 4 except for a new step 509 and an altered admit step 512, both of which will be described hereinafter. Otherwise steps 506 through to 538 correspond to steps 406 to 438. As a result of the search query at step 508, if no active session, given the IP address of a connection, is found then the process moves to step 509 where a search is undertaken for any rejected history or session. This is a check to see whether a specific client has been rejected within a specified time period. If a recent session or recent history has been rejected then the connection is closed immediately at step 522, otherwise the process moves to step 510 where a search is made for an empty history entry or one that may be recycled.

This additional decision action at step 509 addresses the problem of clients gaining admission by frequently making connections. Hence, whenever a connection arrives, it passes through a filter at this step 509. If the connection arrives from a client that has recently had a connection rejected, then the connection is closed without sending a rejection message.

Figure 7:
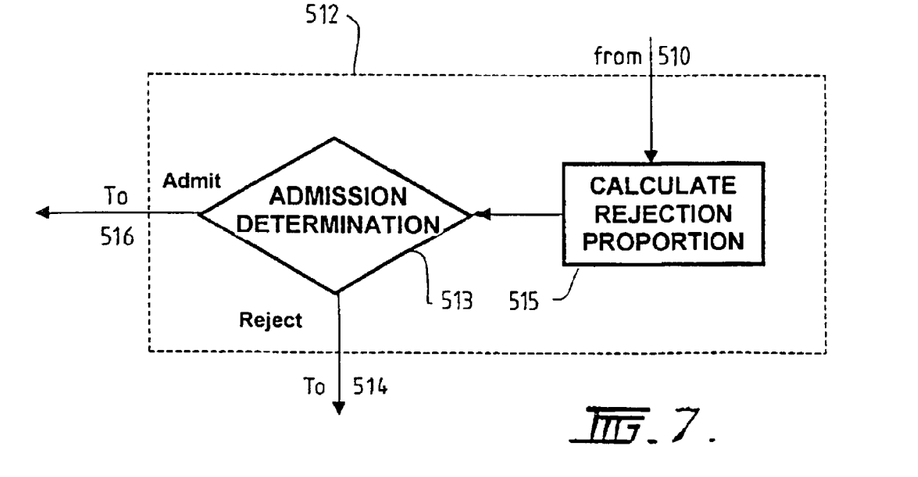
FIG. 7 is a detailed view of one decision point in the flow diagram of FIG. 5.

The admit step at 512 is shown in more detail in FIG. 7. After step 510 the process moves to step 512 where at step 513 a calculation is made for the rejection proportion. This is the proportion of new connections to be rejected and is $$p_r = \frac{c}{c_{max}}$$

where $p_r$ is the proportion of connections to be rejected, c is the congestion level and $c_{max}$ is the maximum congestion level. At step 515 an admission determination is made to admit or reject a new connection. This will happen where $p_r < r$ where r is a random number between 0 and 1 inclusive, which is generated with each new connection. If the equation holds true the new connection is admitted and the process moves to step 516, otherwise the new connection is rejected and the process moves to step 514.

The implementation of the interface unit 10 has been performed in two ways. Firstly, a C implementation that maintains the active session table based only on the IP-address of the source of the request, and secondly using an Erlang based system which uses an active session table based on "cookies" to provide individual user identification for admission control. Cookies are a small quantity of data sent from a web server to a client and stored by the client. The value of a cookie can be requested by a web server.

The interface unit 10 has been developed on a Sun Ultra Enterprise 2 SparcServer, running Solaris 2.5.1 and Intel Pentium based computers running FreeBSD 2.2.2. It is assumed that the web server 6 has the Unix based "rstat" facility.

Figure 8:
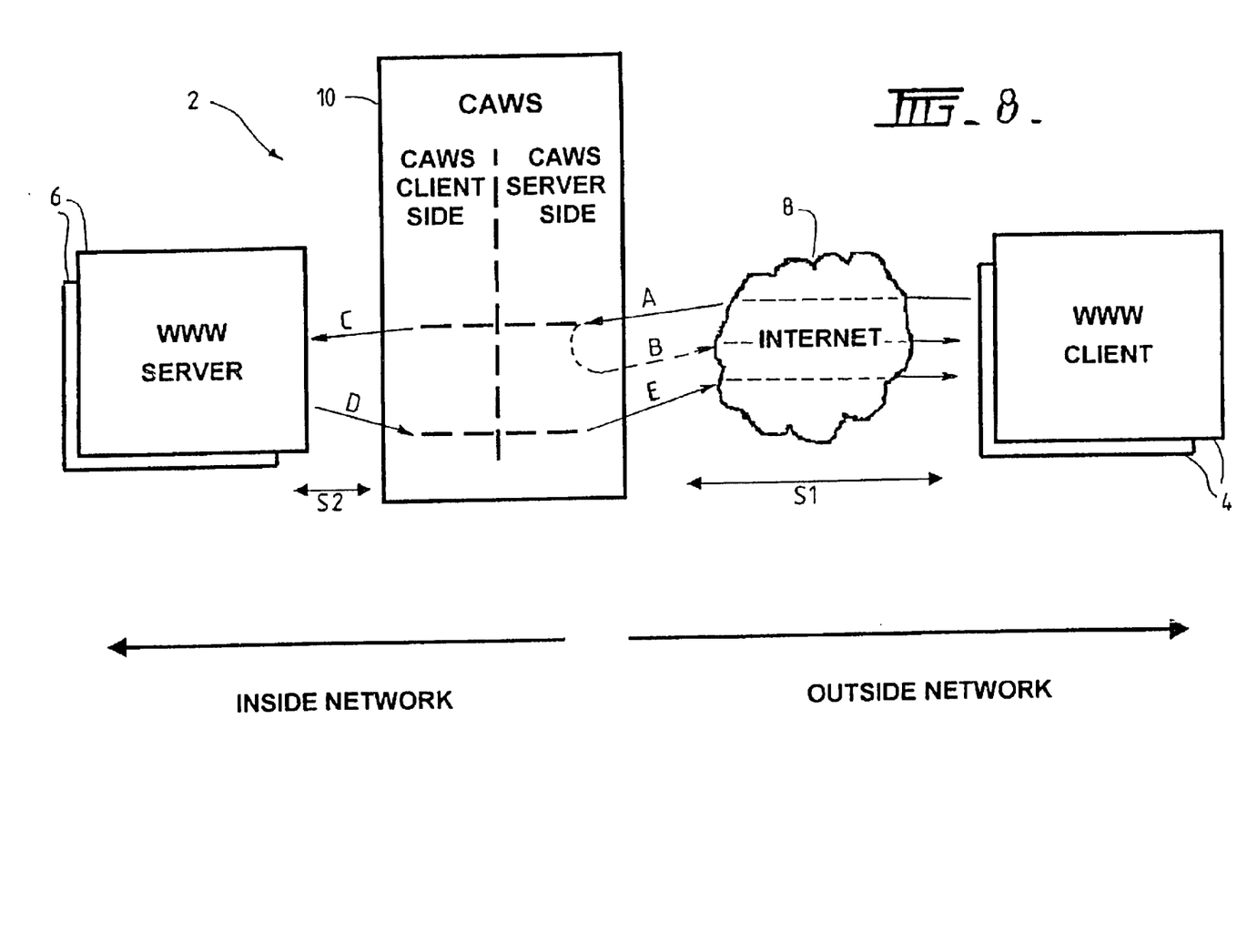
FIG. 8 shows the flow of message streams through the interface means between servers and clients.

Shown in FIG. 8 there is a revised version of FIG. 2 showing the message streams between the various components. The system 2 is separated into two networks, an inside network, comprising the servers 6 and a client side of the interface unit 10, and an outside network comprising a server side of the interface unit 10 together with the Internet 8 and web clients 4. To the outside network, the interface unit 10 appears as a web server. Clients 4 located on the Internet 8 may query the interface unit 10 to gain access to pages held by any one of the web servers 6. When a user wishes to view a page held on the web server 6 their web client 4 opens a stream S1 and issues request A to the interface unit's server side. Admission control is performed on this request using the IP address of the client or a cookie as the key. If the request is accepted, a stream S2 is opened to the web server 6 and the request is forwarded to the web server on link C. Otherwise a rejection message is sent to the client through link B via the stream S1 to the client. The web server 6 responds to the request C using the stream S2 to the interface unit's client side and responds with the requested page D. The requested page is forwarded to the web client 4 through E via the open stream S1 over the Internet 8.

In normal operation all data read from web client 4 is copied to the web server 6 and all data from the web server 6 is copied to the web client 4. However, a delay can be introduced to allow the contents of a data stream to be monitored by buffering the flow of data between the interface unit's server side and the web client 4 to determine the nature of the request, and between the interface unit's client side and the web server 6 to recover HTTP status codes. Furthermore, data can be injected into the flow to allow a replacement page to be sent to the web client 4 or to augment an existing page.

A number of statistics may be gathered by the interface unit 10 including the number of connection attempts, web server errors, the number of bytes transferred and the transfer rate. Additional statistics are gathered from the web server 6 using the "rstat" facility. There are two major versions of the HTTP protocol existing. HTTP/1.0 is the most common and opens and closes the streams for each file transferred from the web server 6. HTTP/1.1 is a newer protocol that opens a stream for a session and allows multiple requests and responses to be transferred through the streams. The current versions of the interface unit 10 are designed to handle both protocols. The C version implementation of the interface unit 10 will now be described.

The C implementation is implemented as a single process which continuously loops through the actions of checking for new connections, admitting or rejecting offered connections and then servicing current connections by transferring bytes to and from the two buffers associated with the external and internal ports 16 and 18.

All memory including tables, history data and buffers is either static or allocated at start up. No dynamic memory operations occur in the main loop of the server. This simplifies the design and eliminates the need to handle the non-availability of a dynamic resource.

Figure 9:
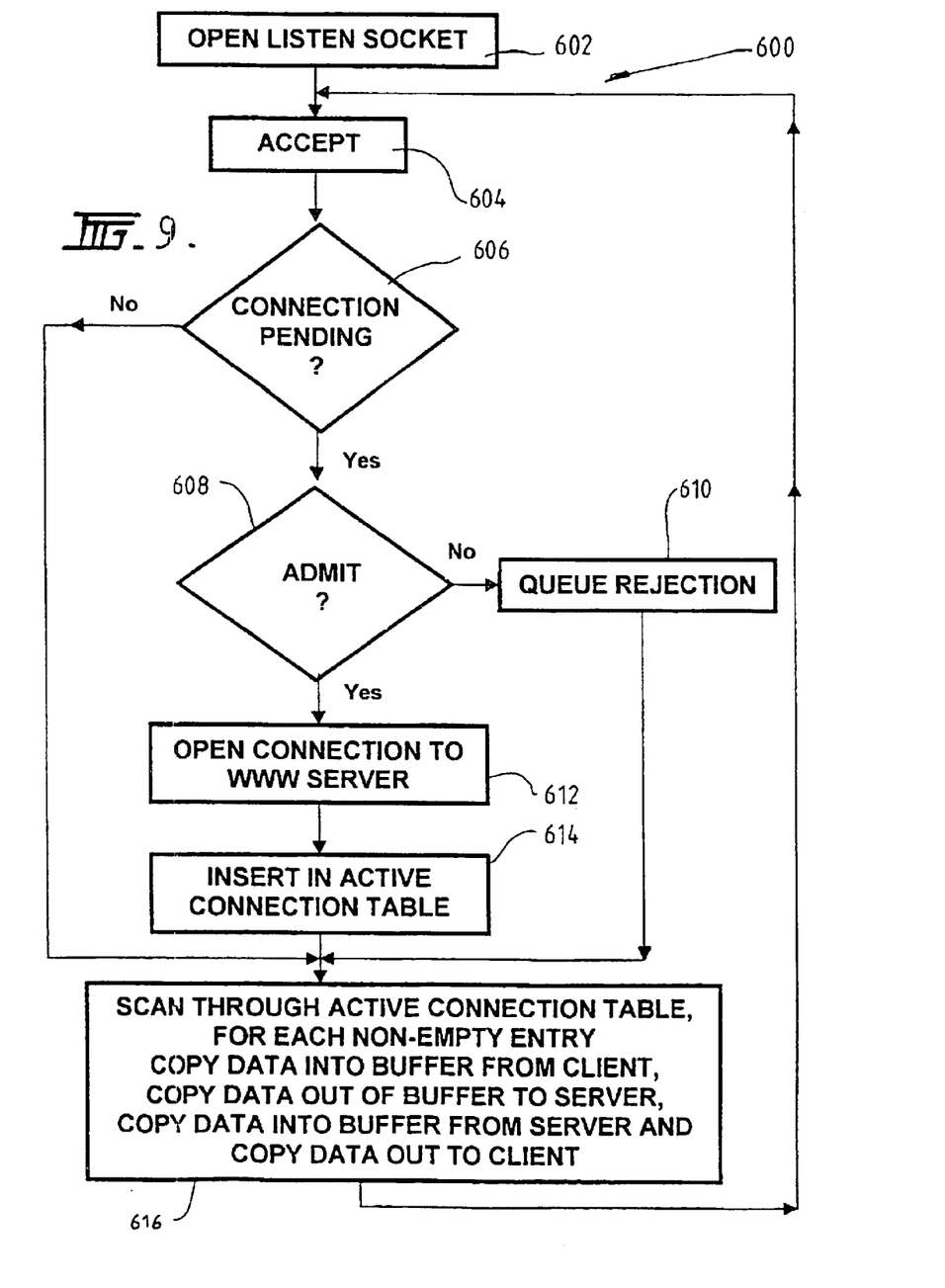
FIG. 9 is a flow diagram of a first implementation of the interface means.
Figure 10:
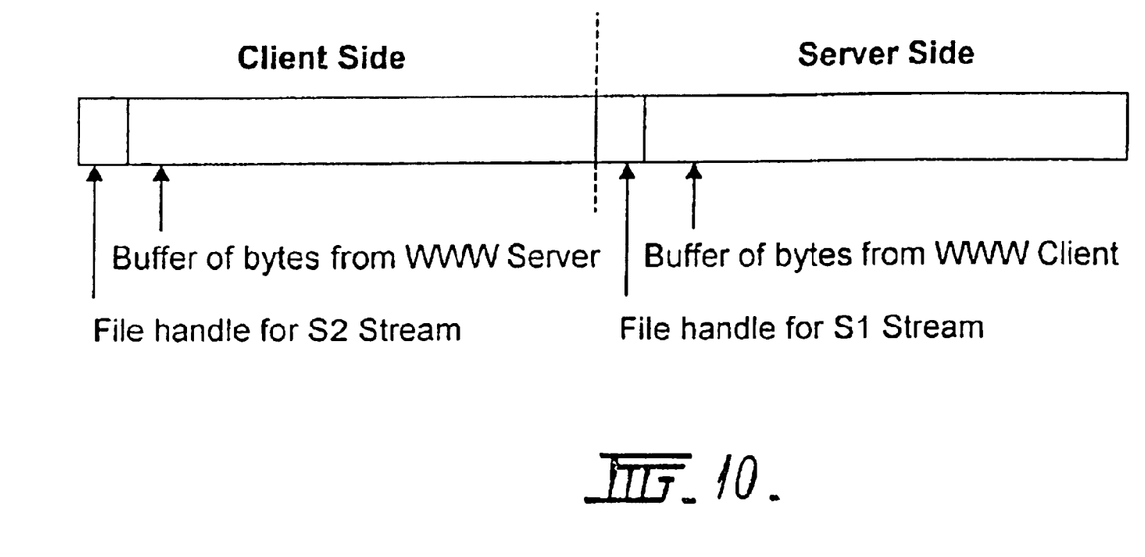
FIG. 10 is a diagram of buffer and stream management for the implementation of FIG. 9.

With reference to FIG. 9, the process 600 starts at step 602 where a listen socket is opened to check for new connections and existing connections. At step 604 the connections are accepted and then the process moves to step 606 where a decision is made as to whether the connection is pending. If it is, it goes to step 608 where another decision is made to admit that connection otherwise if the connection isn't pending it goes to step 616 (to be described). At step 608, if the connection is not admitted it goes to a queue rejection at step 610 which in turn then goes to step 616. Otherwise, if the connection is admitted then the connection is opened to the web server 6 at step 612. Once the connection is opened a record is inserted into the active connection table at step 614. When the connection is accepted by the interface unit 10 a stream is opened up to the web server 6. The file handles of the stream S1 from the client 4, as seen in FIG. 10, and the stream S2 to the web server, are recorded in an empty slot in the active connection table. The active connection table also contains two buffers for bytes travelling from the web server and from the web client respectively as seen in FIG. 10 also. These buffers are used to store incoming bytes read from a stream. If there is data in a buffer it is copied to the output stream and if there is a space in the buffer then data is read from the input stream. At step 616, periodically the process scans through the active connection table and the following copying processes take place:

1. For each non-empty entry data is copied from the operating system buffers on the server side of the interface unit 10 into the "buffer of bytes from the web client" 4;
2. Data is copied from the "buffer of bytes from the web client" 4 to the web server" 6;
3. Data is copied from the operating system buffers on the interface unit's client side into the "buffer of bytes from the web server" 6; and
4. Data is copied from the "buffer of bytes from the web server" 6 to the web client 4.

Figure 11:
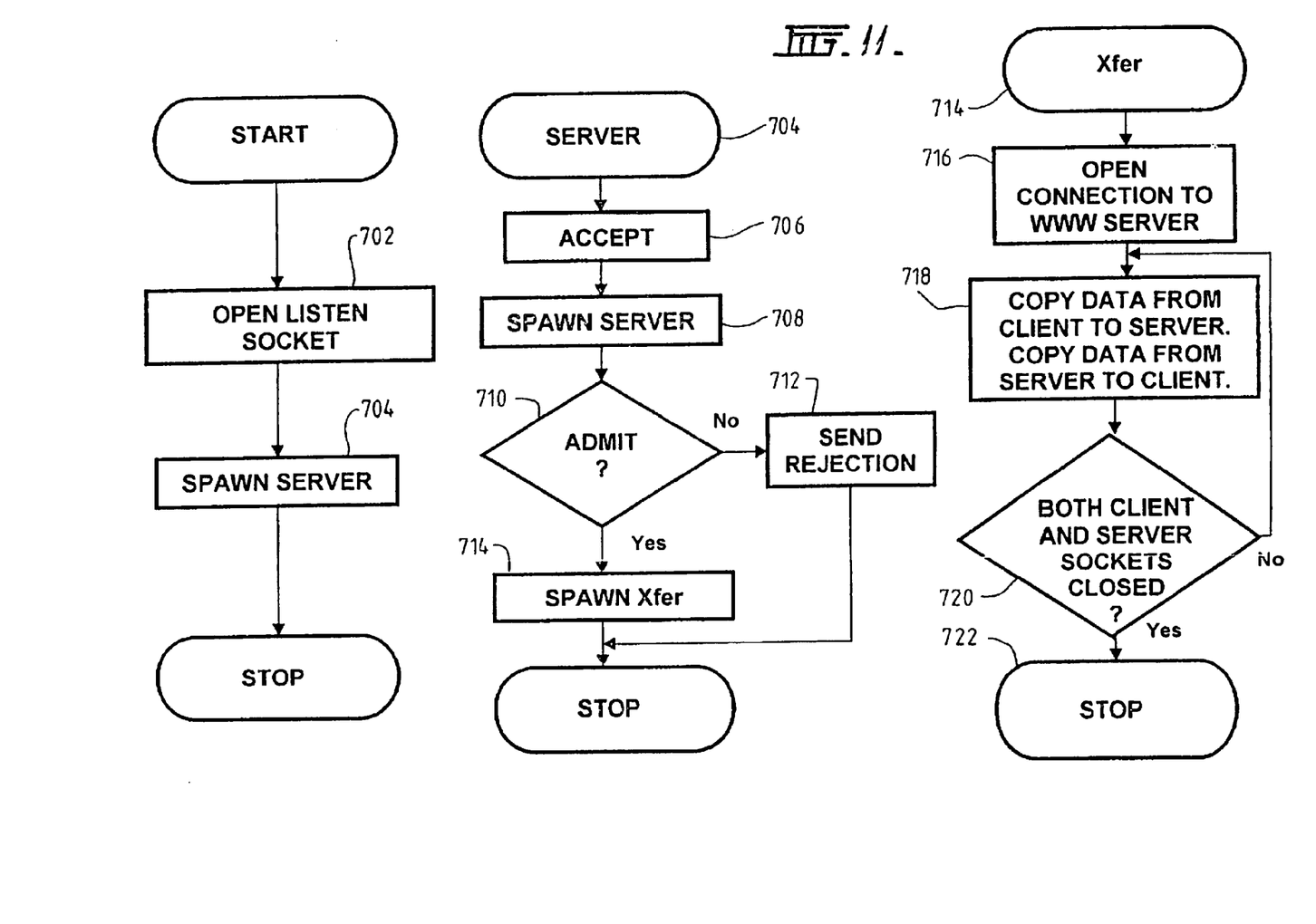
FIG. 11 is a process diagram of a second implementation of the interface means.

The second implementation, the Erlang version, was developed and run using Erlang OTP R3A. The Erlang version consists of a collection of co-operating Erlang processes as to be described with reference to FIG. 11. The initial function call creates a listening socket at step 702 and a server process is spawned at step 704 which is repeated on the right hand side. The server process then waits on an accept until a web client 4 opens a stream S1 to the interface unit's server side. The stream is accepted at step 706 and another copy of the server is immediately spawned at step 708. It is essential that a copy of the server process is always waiting in the accept state to ensure that the interface unit 10 is always able to handle a new request. Admission control is then performed at 710 and if the connection is not to be admitted then a rejection message is sent back to the client at step 712. If the connection is to be admitted, the Xfer routine is called at step 714. The Xfer routine is shown on the right hand side of FIG. 11. The connection is then opened to the web server at step 716 and data is copied from the client to the server and from the server to the client, or in other words between the web server and the web client at step 718 and then at step 720 when both client and server sockets are closed, the process is stopped at step 722. If both sides of the connection are still open then the data copying process is still occurring at step 718.

The Erlang implementation is more elegant than the C version. Using separate processes to handle each active connection allows code to be simplified and eliminates the need for a table of active connections. Once started, the Erlang processes perform the necessary data transfers and report their statistics without requiring oversight.

Statistics are gathered from the web server 6 using the rstat mechanism and a piece of C glue code. The glue code makes a copy of the structure returned by rstat and converts it into an Erlang tuple. An Erlang process periodically polls the rstat service via the glue code.

The system and method of the present invention allows a user, where they have access to a web server, to receive priority access to that server's resources over new users. This ensures that delay in moving from web page to web page on that server is minimised thereby ensuring that the service the user perceives is maintained at an acceptable level.

Throughput is maintained at the highest possible level by ensuring that the interface unit only controls traffic to the web server when the servers resources have, or are approaching, exhaustion. Therefore by controlling traffic before resources are exhausted on a server, the chances of the server breaking down are minimised.

As an example, in a commercial environment such an idea is important when many customers of a company attempt to access the company's web home page to order products. Typically they will go to the company home page and click on a "products" link, and then possibly an "order form" link. If each of these moves is very slow, the customer is likely to be dissatisfied with the level of service received, particularly in the light of the time wasted.

By employing the system of the present invention, the company in the above example ensures that accepted users receive good levels of service while other users are requested to return later when the server is less busy, thereby minimising the amount of time they waste.

What is claimed is:

1. A method of controlling access to a server by a client in a network, said method comprising the steps of:
    monitoring resource usage of said server;
    allowing a connection of said client to pass to said server where said connection forms part of an active session wherein said connection forms part of an active session if at least one previous connection from said client has passed to said server within a predetermined time interval; and
    allowing or rejecting a new connection of another client to pass to said server according to an admission control scheme including determining a congestion level in response to said monitorings step; and
    calculating a further predetermined time interval based on said congestion level, whereby said new connection is allowed to pass to said server after said further predetermined time interval has expired.

2. A method according to claim 1 wherein the step of allowing or rejecting is based on said resource usage of said server.

3. A method according to claim 1 further comprising the step of searching for an active session of said client and admitting a connection of said client to pass to said server if there is an active session for said client.

4. A method according to claim 1 wherein said further predetermined time interval represents the time since a new connection was allowed.

5. A method according to claim 1 wherein the allowance of said new connection begins an active session.

6. A method according to claim 1 further including the step of allowing a proportion of new connections to pass to said server based on said congestion level.

7. A method according to claim 6 further comprising the step of searching for previous rejections or previous connections whereby a new connection of a client is rejected and closed if said client has had a previous connection or a previously rejected connection within a specified time period.

8. A method according to claim 6 wherein said proportion of new connections to be rejected $p_r$ is $$p_r = \frac{c}{c_{max}}$$

where c is the congestion level and $c_{max}$ is the maximum congestion level.

9. A method according to claim 8 further including the step of generating a random number r where r is between zero and one inclusive for each new connection.

10. A method according to claim 9 wherein new connections are allowed to pass to said server if $p_r \leq r$ or are rejected if $r < p_r$.

11. A method according to claim 1 further including the step of increasing the congestion level if the resource usage is above a first predetermined threshold level.

12. A method according to claim 1 further including the step of decreasing the congestion level if the resource usage is below a second predetermined threshold level.

13. A method according to claim 1 wherein said congestion level is represented by a number between zero and $c_{max}$, where zero indicates that the server is operating normally and $c_{max}$ is the maximum congestion level.

14. An interface unit for controlling access to a server by a client in a network, said interface unit comprising:
    means for monitoring resource usage of said server;
    admission means for allowing a connection of said client to pass to said server where said connection forms part of an active session wherein said connection forms part of an active session if at least one previous connection from said client has passed to said server within a predetermined time interval;
    said admission means further rejecting or allowing a new connection of another client to pass to said server according to an admission control scheme, the admission control scheme including setting a congestion level;
    wherein a further predetermined time interval is calculated based on the congestion level such that a new connection is allowed to pass to said server after said further predetermined time interval has expired.

15. An interface unit according to claim 14 wherein said admission means further rejecting or allowing said new connection is based on said resource usage of said server.

16. An interface unit according to claim 14 further comprising a first port for connection to the computer network and a second port for connection to the server.

17. An interface unit according to claim 16 wherein said admission means is connected between said first port and said second port.

18. An interface unit according to claim 16 wherein said first port has buffer means for storing connections prior to being allowed or rejected by said admission means.

19. An interface unit according to claim 18 wherein said first port routinely polled for stored connections.

20. An interface unit according to claim 14 wherein said monitoring means is a storage means, such as a database, said storage means linked to said admission means.

21. An interface unit according to claim 20 wherein said storage maintains a table of active sessions of respective clients.

22. An interface unit according to claim 21 wherein said table of active sessions is scanned to determine if said connection is associated with an active session in said table of active sessions.

23. An interface unit according to claim 22 wherein if an active session exists in said table of active sessions for said connection, said connection is passed to said server through said admission means.

24. An interface unit according to claim 23 wherein said connection is passed to said server using a connection slot.

25. An interface unit according to claim 22 wherein is no active session exits in said table of active sessions, a search is performed of said storage means for an empty history entry.

26. An interface unit according to claim 25 wherein if said empty history entry is found or an expired history entry is found, said connection is either allowed or rejected in accordance with said admission control scheme.

27. An interface unit according to claim 26 wherein an allowed connection is passed to said server using a connection slot or a rejected connection is returned to the respective client using a connection slot and forwarded with a rejection message.

28. An interface unit according to claim 25 wherein if said history is not found, said connection is subsequently closed.

29. An interface unit according to claim 14 wherein said further predetermined time interval represents the time elapsed since a new connection was allowed.

30. An interface unit according to claim 16 wherein said new connection is assigned an active session which is subsequently stored in said table of active sessions.

31. An interface unit according to claim 16 wherein said admission means allows a proportion of new connections to pass to said server based on said congestion level.

32. An interface unit according to claim 31 wherein said proportion of new connections to be rejected $p_r$ is $$p_r = \frac{c}{c_{max}}$$

where c is the congestion level and $c_{max}$ is the maximum congestion level.

33. An interface unit according to claim 32 wherein a random number r is generated for each new connection where r is a number between zero and one inclusive.

34. An interface unit according to claim 33 wherein said admission mean allows new connections to pass to said server if $p_r \leq r$ are rejected if $r < p_r$.

35. An interface unit according to claim 31 wherein said storage means stores information about previous connections including previously rejected connections of various clients.

36. An interface unit according to claim 35 wherein a new connection of a client is rejected and closed if the client has had a previous connection or a previously rejected connection within a specified time period.

37. An interface unit according to claim 14 wherein said monitoring means periodically polls said server to obtain information on said resource usage of said server and subsequently stores said resource usage information.

38. An interface unit according to claim 16 wherein said congestion level is increased if said resource usage is above a first predetermined threshold level.

39. An interface unit according to claim 16 wherein said congestion level is decreased if said resource usage is below a second predetermined threshold level.

40. An interface unit according to claim 16 wherein said storage means is updated after a time interval I with information including resource usage of said server, history information and the present congestion level.

41. A communications system incorporating an interface unit according to claim 14 wherein said interface unit is connected between said server and said network and one or more clients are linked to said server through said network.

42. A communications system incorporating an interface unit according to claim 14 wherein said interface unit forms part of said server and said interface unit is linked to one or more clients through said network.

* * * * *